United States Patent [19]

Miyazaki et al.

[11] Patent Number: 5,381,691
[45] Date of Patent: Jan. 17, 1995

[54] AIR FLOW METER

[75] Inventors: Atsushi Miyazaki; Chihiro Kobayashi; Shinya Igarashi; Tetsuo Matsukura; Haruhiko Maeda, all of Katsuta; Nobukatsu Arai, Ushiku; Yoshihito Sekine, Ibaraki, all of Japan

[73] Assignees: Hitachi, Ltd., Tokyo; Hitachi Automotive Engineering Co., Ibaraki, both of Japan

[21] Appl. No.: 126,759

[22] Filed: Sep. 27, 1993

Related U.S. Application Data

[63] Continuation of Ser. No. 779,402, Oct. 18, 1991, abandoned.

[30] Foreign Application Priority Data

Oct. 19, 1990 [JP] Japan ............................. 2-279050

[51] Int. Cl.6 .................................................. G01F 1/68
[52] U.S. Cl. ........................................ 73/202.5; 73/118.2
[58] Field of Search ................... 73/118.2, 202, 202.5, 73/204.21

[56] References Cited

U.S. PATENT DOCUMENTS

| 3,314,290 | 4/1967 | Peranio | 73/202 |
| 3,735,752 | 5/1973 | Rodder | 73/204.21 X |
| 4,709,581 | 12/1987 | Nishimura et al. | 73/202 |
| 4,887,577 | 12/1989 | Arai et al. | 73/118.2 X |

FOREIGN PATENT DOCUMENTS 1-206223  8/1989  Japan .

*Primary Examiner*—Herbert Goldstein
*Attorney, Agent, or Firm*—Antonelli, Terry, Stout & Kraus

[57] ABSTRACT

An air flow meter comprises a main passage for an axial main air flow; an axial subpassage for air flow, disposed in the main passage and formed so that part of the air in the main passage is taken in at an upstream side thereof and flows in the same direction as the axial main air flow; a radial subpassage for air flow, intersecting the axial subpassage at a downstream side of the axial subpassage so that air from the axial subpassage flows into the radial subpassage and is divided into two radial air flows running in different radial directions; the air having passed through the radial subpassage joining the axial main air flow. An air flow sensing means is disposed in the radial subpassage for sensing a flow rate of air therein, and a projection is disposed in the radial subpassage around the intersection of the axial and radial subpassages, for suppressing turbulence of air flow around the intersection.

4 Claims, 5 Drawing Sheets

AIR FLOW METER

This application is a continuation application of Ser. No. 07/779,402, filed Oct. 18, 1991, now abandoned.

BACKGROUND OF THE INVENTION

The present invention relates to an air flow meter and, more particularly, to a thermal type air flow meter for internal combustion engines which constitutes a part of an air intake system, and which is suitable to detect an air flow rate in the air intake system and control a fuel injection amount corresponding to the air flow rate.

An example of a conventional thermal type air flow meter for internal combustion engines is disclosed in JP-A-1-206223, wherein the air flow meter comprises a main air flow passage, a bypass air flow passage in the main air flow passage having air flow sensing elements disposed therein. The having bypass air flow passage consists of an axial bypass air flow passage in which air flows in the axial direction and in which the air flow sensing elements are disposed. A radial bypass air flow passage intersects the axial bypass air flow passage at right angles, whereby an inverted T-letter bypass air flow passage is formed in the main air flow passage.

In the conventional air flow meter, complicated eddies occur around the intersection of the axial bypass air flow passage and the radial bypass air flow passage by impinging the air flow from the axial bypass air flow passage on a bottom wall of the radial bypass air flow passage and by abruptly changing the air flow direction at intersecting surfaces of the two bypass air flow passages. The complicated eddies cause unsteady change in pressure, which causes fluctuation in flow rate where the sensing elements are disposed. The sensing elements sense the fluctuation in flow rate, thereby increasing output noise of the sensor.

SUMMARY OF THE INVENTION

An object of the invention is to provide an air flow meter which comprises a main air passage, a subpassage for sampling air flow disposed in the main air passage and branching off two ways at a branching point or intersection, and an air flow sensing element disposed in the subpassage at an upstream side of the branching point, and which is able to produce precise flow rate detection by eliminating output noise increase in a transitional flow rate region in which air flow in the subpassage changes from laminar flow to turbulent flow.

Another object of the invention is to prevent an air flow rate in the subpassage from being reduced by reducing passage loss occurred at the above-mentioned branching point in the subpassage, whereby the width of the subpassage at the downstream side of the branching point can be reduced in order to produce the same flow rate as in a corresponding conventional subpassage (with no projection at the branching point). Therefore, influence of intake air flow pulsation of an internal combustion engine on a flow rate at the subpassage is reduced so that precise air flow detection can be effected.

The claimed air flow meter is characterized in that a projection is provided around the above-mentioned branching point or intersection of the subpassage so as to guide air to directly flow into branched lines of the subpassage.

The projection reduces occurrence of complicated eddies around the branching point, thereby eliminating sensor output noise.

An example of the subpassage comprises an axial subpassage extending in the same direction as the main passage, and a radial subpassage intersecting the axial subpassage. In this case, the projection guides the air from the axial subpassage so as to directly flow into the radial subpassage, whereby decrease in a flow rate at the radial subpassage is prevented and the width of the radial subpassage can be reduced. The radial subpassage of the width reduced in scale in a perpendicular direction both to the axial direction and to the radial direction can reduce influence of reversal flow due to engine suction air pulsation on the air flow rate at the radial subpassage, so that the intake air flow rate can be measured at a high precision.

DESCRIPTION OF EMBODIMENTS OF THE INVENTION

Figure 1:
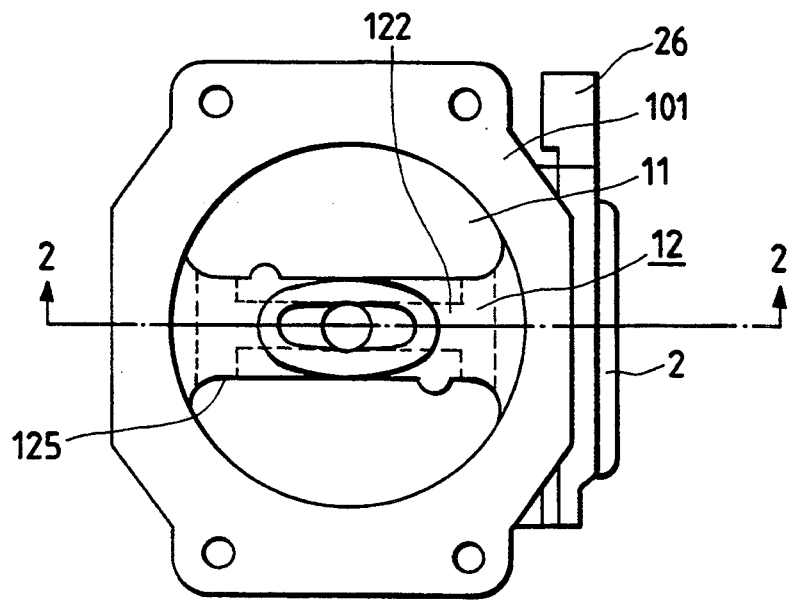
FIG. 1 is a plan view of an embodiment of an air flow meter according to the present invention.

Referring to FIGS. 1 to 4, an embodiment of an air flow meter according to the invention will be described hereunder in detail.

In FIGS. 1 to 4, an air flow meter, a typical example of which is a thermal type air flow meter, comprises a flow meter body 1, an air flow sensing unit or module 2 incorporated in the flow meter body 1 and a rear lid 3 fixed to the main flow meter body. The flow meter body 1 has a main air flow passage 11 formed therein in an axial direction and a subpassage 12 for air flow coaxially disposed in the main passage 11 so that a part of air flowing in the main passage enters the subpassage 12 at the upstream side thereof and joins the air flow in the main passage 11 at the downstream side of the subpassage 12.

The subpassage 12 comprises an axial subpassage 121 in which air is taken therein from the main passage at an upstream side thereof and flows in the same direction as the air flow in the main passage 11, and a radial subpassage 122 for air flow intersecting the axial subpassage 121 at right angles so that the air from the axial subpassage 121 flows into the radial subpassage 122 and is divided, at the intersection (J), into two air flows which run in the opposite directions, and joins the air in the main passage 11 through end openings 125 at a downstream side of the subpassage 122. The end openings 125 are opened to the main passage 11 perpendicularly to or in parallel with an axis of the main passage 11. The axial subpassage 121 is defined by the flow meter body 1 and the radial subpassage 122 by the flow meter body 1 and a rear lid 3. The rear lid 3 is fixed to the flow meter body 1 to form a downstream side wall of the radial subpassage 121 by means of pressure welding, screw means, adherence, etc..

The air flow sensing module 2 comprises air flow sensing elements disposed in the axial subpassage 121, a plastic support mold 21 inserted in the flow meter body 1, a detection control circuit 25 for generating electric signals corresponding to flow rate based on detected data, which is a conventional construction, and a connector 26. The sensing elements comprise a heat generation element 23 (a kind of electric resistor), a temperature sensitive resistance element 24, and terminals 22 connecting thereto the elements 23 and 24.

The rear lid 3 is provided with a projection 301 at the intersection (J) of the axial subpassage 121 and the radial subpassage 122. The projection projects from the surface of the rear lid 3 toward a downstream side of the axial subpassage 121 and has at the top a ridge extending perpendicularly to the direction of the subpassage 122 with the same height. The projection 301 gradually expands circularly from the ridge portion toward the bottom surface of the rear lid 3, and is shaped circularly on the bottom surface, as well. The circular shaped spread portion has a diameter substantially the same as that of the radial subpassage 121. Namely, the shape of the projection 301 is such that both sides of a short column on the surface of the lid 3 are cut off along the ridge by a pair of symmetrically inclined planes. The rear lid 3 is of aluminum or steel plate formed by press-working, plastic mold or aluminum die cast.

When the air flow meter is used for an internal combustion engine, the air flow meter is connected to an air intake passage of an air filter side at an intake air inlet part 101 thereof and to the intake passage of an engine intake valve side at an downstream side 102 thereof, whereby the air flow meter constitutes a part of the intake air passage of the engine. Therefore, air flows in the main passage 11 and in the subpassage 12 from the air inlet part 101 to the downstream side 102, as shown by an arrow 4.

According to this embodiment, air taken in the air flow meter flows in the main passage 11, and a part of the air flows into the subpassage 12. The air in the axial subpassage 121 flows into the radial subpassage 122 while being divided into two air flows in opposite directions. The projection 301 provided at the intersection (J) guides the air from the axial subpassage 121 so as to be smoothly divided into the two air flows and to flow directly into the radial subpassage 122 in the opposite directions with minimal air flow loss in the passage loss. Each air flow joins the air flow in the main passage 11 at the end openings 125 provided at both ends of the radial subpassage 122.

When there is no projection on the rear lid 3 at the intersection (J), the air flow sensing element senses fluctuation in air flow rate, caused by complicated air flows such as eddies, caused around the intersection (J) of the axial subpassage 121 and the radial subpassage 122 thereby output noise of the air flow sensing element.

By provision of the projection 301, such output noise increase as mentioned above can be minimized drastically.

Further, by the projection 301, the air from the axial subpassage 121 is equally divided into two air flows in the radial subpassage 122.

It is preferable to provide the projection around the intersection so that the air from the axial subpassage 121 is divided into the two substantially equal air flows in the radial subpassage 122.

Figure 5:
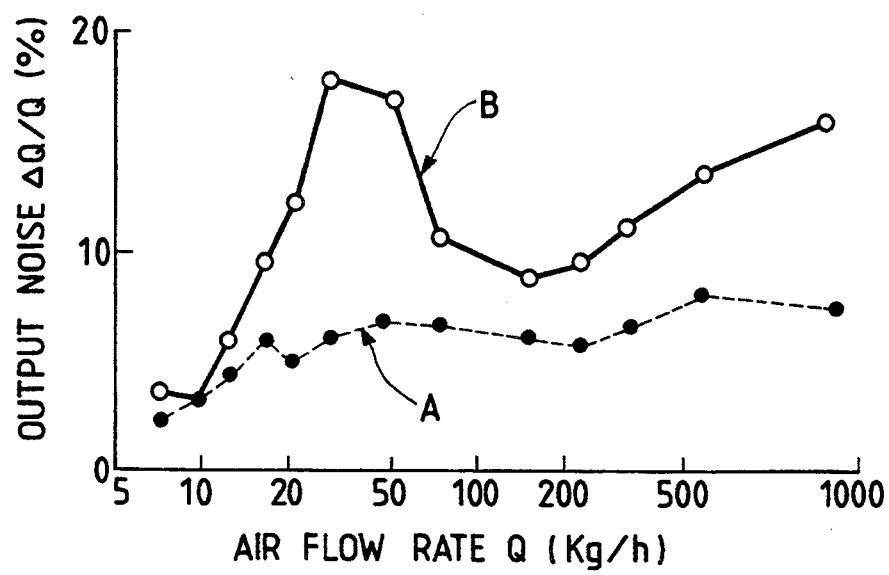
FIG. 5 graphs the relationship between output noise and air flow rate.

In FIG. 5, there is shown the difference between the output noise in case (B) having no projection and the output noise in case (A) having the projection 301 at the intersection (J).

Here, the output noise is defined as a value of $8\sigma$ which is obtained by measuring sensor output several hundred times, calculating a standard deviation ($\sigma$) and then calculating $8\sigma$. Namely, the output noise is defined as a value which is flow rate detection error ($\Delta Q/Q$) into which a maximum output variation width ($8\sigma$) is converted ($\Delta Q$: flow rate detection variation width, Q: flow rate).

When the projection 301 is not provided at the intersection (J), a peak appears around an air flow rate of 30 kg/h. The air flow rate is in a transitional region from a laminar flow to a turbulent flow in view of relationship between Reynolds number and a flow rate in the subpassage formed of a circular cross-sectional tube. The above-mentioned phenomenon occurs remarkably in the transitional flow rate region and the output noise increases there.

The above-mentioned phenomenon can be eliminated by providing the projection 301 at the intersection (J), to stabilize and minimize the output noise level.

Further, since a flow rate in the subpassage 12 increases when the projection 301 is provided as compared with when no projection is provided, substantially the same flow rate as above can be obtained by narrowing the width of the radial subpassage 122 in the axial direction. This means that the width of the radial subpassage can be made narrower. Therefore, when the engine runs at a low revolutional speed and with a large opening of throttle valve of the engine, a reverse air flow into the subpassage 12, which is, in particular, remarkably caused by intake pulsation, can be reduced. Therefore, the construction is effective for high precision flow rate detection.

The height of the projection 301 is to such an extent that output noise can be reduced, and a preferable example of the height is about approximately ½ of the height of the radial subpassage 122.

Figure 2:
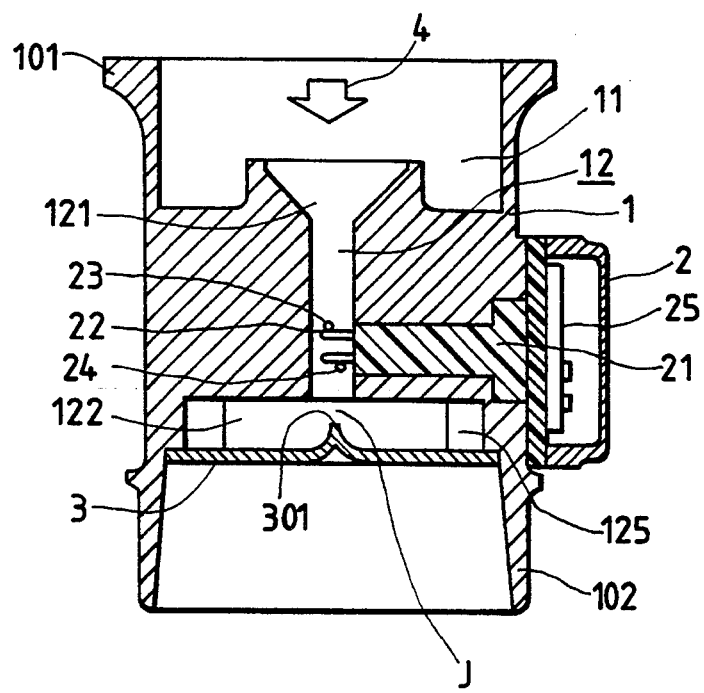
FIG. 2 is a sectional view taken along a line 2—2 in FIG. 1.
Figure 3:
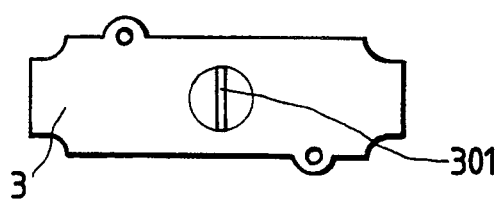
FIG. 3 is a plan view of a rear lid used in the air flow meter shown in FIGS. 1 and 2.
Figure 4:
FIG. 4 is a side view of the rear lid shown in FIG. 3.
Figure 6:
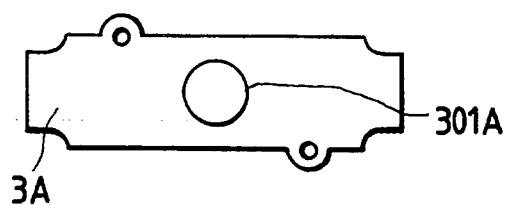
FIG. 6 is a plan view of another embodiment of a rear lid according to the present invention.
Figure 7:
FIG. 7 is a side view of the rear lid shown in FIG. 6.

FIGS. 6 and 7 show another embodiment of a rear lid for the subpassage of the air flow meter as shown in FIGS. 1 and 2 instead of the rear lid 3.

In FIGS. 6 and 7, the rear lid 3A is provided with a projection 301A which is formed into a hemisphere. When the height of the projection 301A is about ½ the height of the radial subpassage 122, it effectively reduces the output noise as does the projection 301 of rear lid 3.

Figure 8:
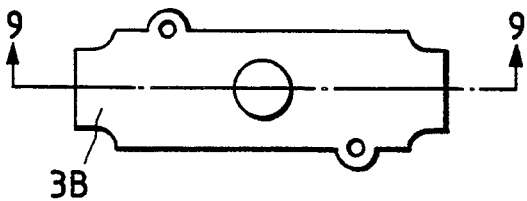
FIG. 8 is a plan view of a further embodiment of a rear lid according to the present invention.
Figure 9:
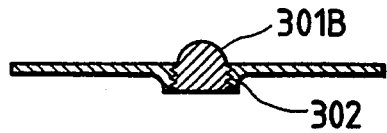
FIG. 9 is a sectional view of the rear lid taken aong a line 9—9 of FIG. 8.

FIGS. 8 and 9 show a further embodiment of a rear lid as used for the radial subpassage of the air flow meter shown in FIGS. 1 and 2.

The rear lid 3B has a projection 301B. The projection 301 has an end portion in the form of a hemisphere, at a top end thereof for guiding an air flow from the axial subpassage 121, and a screw portion 302 at the opposite end which is screwed in a screw hole formed in the rear lid 3B. The height of the projection 301B can be adjusted suitably, so that the adjustment of the projection height suitable for reduction of the output noise and, thus, for setting a flow rate.

Figure 10:
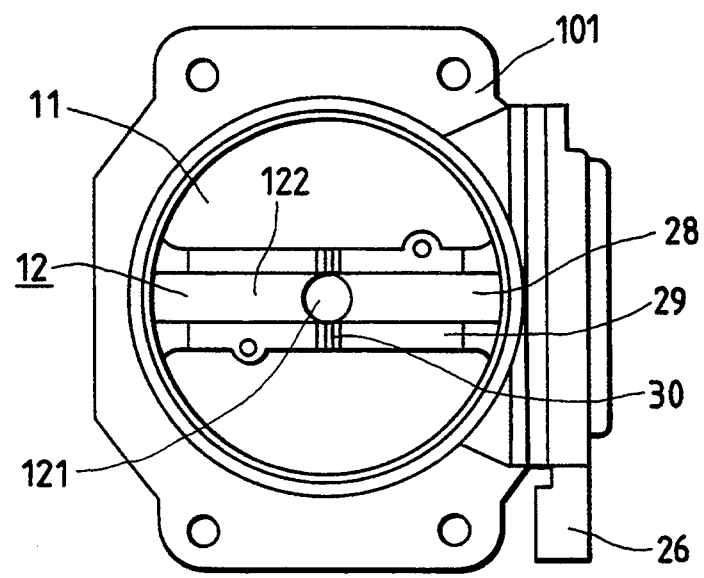
FIG. 10 is a bottom view of another embodiment of an air flow meter according to the present invention.
Figure 11:
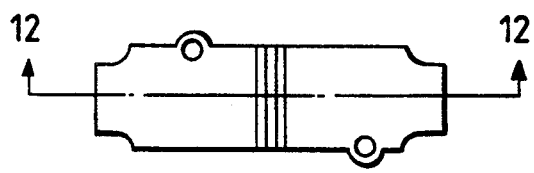
FIG. 11 is a plan view of a rear lid used in the air flow meter shown in FIG. 10.
Figure 12:
FIG. 12 is a sectional view of the rear lid taken along a line 12—12 of FIG. 11.

FIGS. 10, 11 and 12 show another embodiment of the air flow meter according to the invention.

FIG. 10 is a bottom view of the air flow meter, that is, this is as viewed from an opposite side of FIG. 1. In FIG. 10, the same portions as or equivalent portions to the embodiment shown in FIGS. 1 to 4 have the same reference numbers.

In FIG. 10, a subpassage 12 consists of an axial subpassage 121 and a radial subpassage 122 as in the embodiment shown in FIGS. 1 to 4. The radial subpassage 122 is defined by an upper wall portion 28, a pair of side wall portions 29, of a flow meter body and a rear lid 3C (not assembled in FIG. 10 but to be incorporated therein). V-shaped grooves 30 are formed in parts of side wall portions 29, respectively. The lid 3C has a projection 301C formed therein so as to extend in a perpendicular direction to the axis of the radial subpassage 122. The projection 301C is shaped as an inverted letter-V with the top being flattened or rounded, and both ends of the projection are fitted in the V-grooves so that the rear lid defines the bottom side of the radial subpassage 122. When the rear lid 3C is assembled in the flow meter body, the projection 301C of the rear lid 3C projects from the surface of the rear lid 3C toward the axial subpassage 122, whereby the projection 301C has an effect similar to the previously mentioned rear lid embodiments.

Figure 13:
FIG. 13 is a sectional view of a further embodiment of a rear lid according to the present invention.

FIG. 13 shows another embodiment of a rear lid. The rear lid 3D has a projection 301D inserted in a rectangular slit formed in the rear lid 3D and fixed to the rear lid 3D by means of pressure welding or adherence. The projection 301D has a shape and effect similar to the shape and effect of the projection 301C shown in FIGS. 11 and 12.

Figure 14:
FIG. 14 is a sectional view of a further embodiment of a rear lid according to the present invention.

FIG. 14 also shows a further embodiment of a rear lid. The rear lid 3E has an inverted letter V shaped projection 301E made of plate and inserted in two parallel grooves formed in the rear lid 3E. The rear lid 3E also is assembled in the flow meter body to define a part of the radial passage 122.

Figure 15:
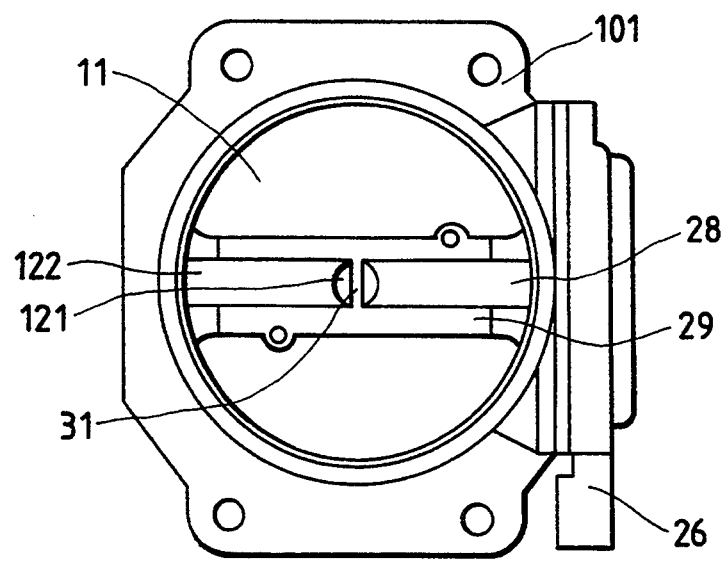
FIG. 15 is a bottom view of a further embodiment of an air flow meter according to the present invention.
Figure 16:
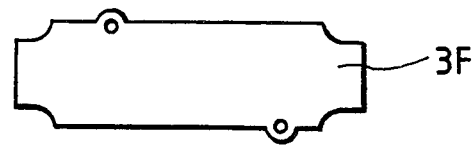
FIG. 16 is a plan view of a rear lid used in the air flow meter shown in FIG. 15.

Another embodiment of an air flow meter according to the invention will be described hereunder in detail, referring to FIGS. 15 and 16. FIG. 15 is a bottom view of the air flow meter, with a rear lid 3F, shown in FIG. 16, removed therefrom.

The embodiment is the same construction as the previously described embodiment except for parts or portion concerning the lid and projection. The projection for guiding air flow from an axial subpassage 121 into a radial subpassage 122 to branch into two even if flows is formed by a bar or rib 31 which spans both side wall portions defining a part of the radial subpassage. The rib 31 is a part of the flow meter body and cast together with casting of the flow meter body. Therefore, the rear lid 3F has no projection formed thereon. The rib 31 is a projection 31 provided on the rear lid 3F when the rear lid 3F is incorporated into the flow meter body.

Figure 17:
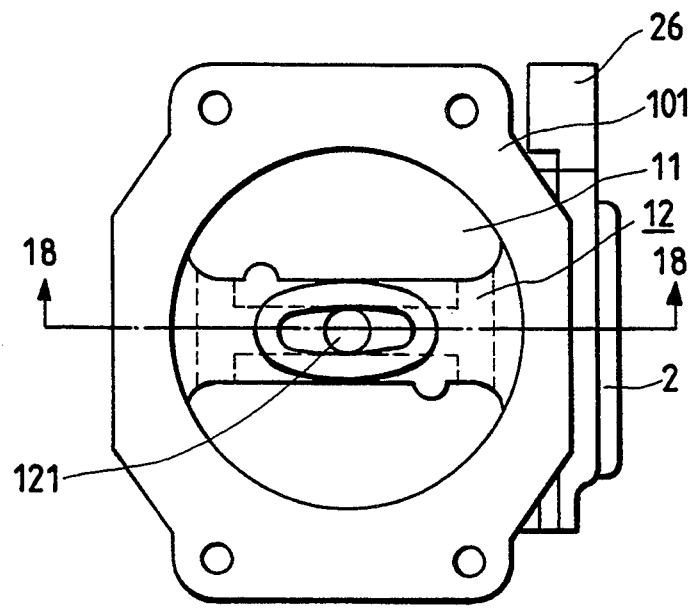
FIG. 17 is a plan view of a further embodiment of an air flow meter according to the present invention.
Figure 18:
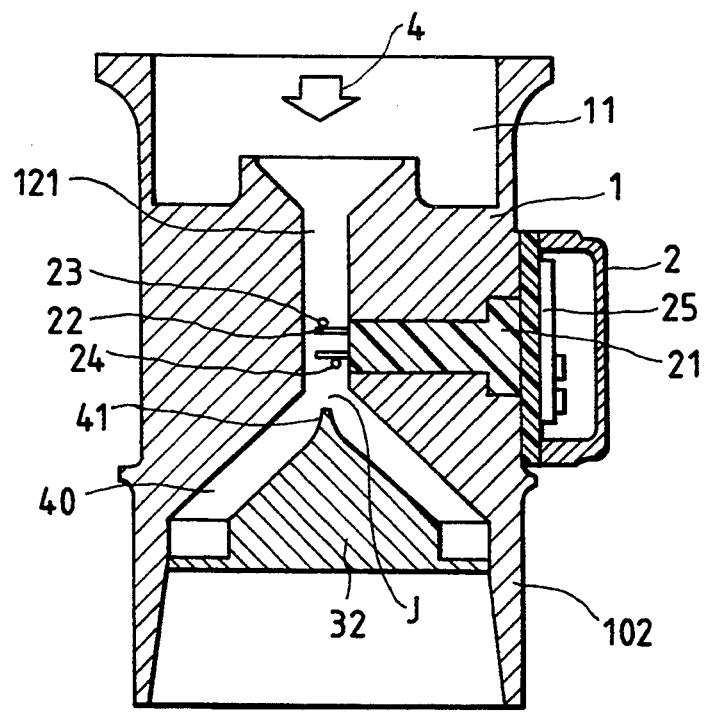
FIG. 18 is a sectional view taken along a line 18—18 of FIG. 17.

Still further embodiment of an air flow meter according to the present invention will be described hereunder, referring to FIGS. 17 and 18.

This embodiment is the same as one shown in FIGS. 1 to 4 except for a radial subpassage and a rear lid with a projection. Therefore, an explanation is made only on the different parts from the embodiment shown in FIGS. 1 to 4.

The radial subpassage 40 is formed in an inverted V-letter shape and branched into two passages at a portion a little downstream side of the air flow sensing elements 23, 24. The subpassage 40 is defined by part of the flow meter body and a rear lid 32.

The rear lid 32 has a pair of inclined faces for defining a part of the radial subpassage of the inverted V-letter shape and a projection 41 disposed at a top of the included faces, that is at a intersection (J) of the axial subpassage 121 and the inverted V-letter shaped subpassage 40 which is radially inclined. The projection has a function to guide air flow from the axial subpassage 121 to directly branch into two air flows in the subpassage 40.

What is claimed is:

1. The air flow meter, comprising:
   a main passage through which an air flow is supported to an internal combustion engine;
   a first subpassage for air flow, disposed in and coaxially with said main passage so that part of said air flow in said main passage enters said first subpassage at an upstream side of said first subpassage and flows in a same direction as said air flow in said main passage;
   a second subpassage for air flow, intersecting said first subpassage at a downstream end of said first subpassage so that air from said first subpassage flows into said second subpassage and is divided therein into two radial air flows flowing in opposite radial directions and air passing through said second subpassage joins with said air flow in said main passage;
   air flow sensing means disposed in said first subpassage for sensing a flow rate of air flowing therein; and
   a projection disposed at said intersection of said first and second subpassages so as to project from a downstream side wall of said second subpassage toward said air flow sensing means, for guiding air flowing from said first subpassage into said second subpassage so that a ratio between said two radial air flows is substantially constant, said projection having a height less than a height of said second subpassage,
   wherein said projection is formed into a hemisphere.

2. The thermal type air flow meter for an internal combustion engine, said air flow meter comprising:
   a flow meter body;
   a main passage for air flow in said flow meter body so as to supply air into said engine;
   an axial subpassage for air flow disposed in and coaxially with said main passage;
   a radial subpassage for air flow, formed except for a downstream side wall thereof, in said flow meter body so as to intersect with said axial subpassage at substantially right angles, wherein air from said axial subpassage is divided into two radial air flows flowing into said radial subpassage and said air, having passed through said radial subpassage, joins said air flow in said main passage;

a rear lid secured to said flow meter body to define said downstream side wall of said radial subpassage;

a flow rate sensing unit, having a flow rate sensing part incorporated in said flow meter body so that said air flow sensing part is disposed in said axial subpassage, an electric circuit for generating electric signals corresponding to a flow rate of said air flow in said axial subpassage based upon signals from said flow rate sensing part, and a connector; and a projection, provided on said rear lid at said intersection of said axial and radial subpassages so as to project from said downstream side wall toward a downstream side end of said axial subpassage to face said air flow sensing part, for projecting two substantially equal air flows from said axial subpassage into said radial subpassage, said projection having a height less than said radial subpassage, wherein said rear lid is of a plate having said projection on one side thereof, and wherein said projection projects from said rear lid having a hemispherical shape.

3. An air flow meter, comprising:

a main passage through which an air flow is supplied to an internal combustion engine;

a first subpassage for air flow, disposed in and coaxially with said main passage so that part of said air flow in said main passage enters said first subpassage at an upstream side of said first subpassage and flows in a same direction as said air flow in said main passage;

a second subpassage for air flow, intersecting said first subpassage at a downstream end of said first subpassage so that air from said first subpassage flows into said second subpassage and joins said air flow in said main passage, said second subpassage having a downstream side wall which is perpendicular to said first subpassage and receives an air flow coaxial with said air flow in said main air flow;

air flow sensing means disposed in said first subpassage for sensing a flow rate of air flowing therein; and a projection disposed on said downstream side wall of said second subpassage at an intersection of said first and second subpassage so as to project from said downstream side wall of said second subpassage towards said air flow sensing means, said projection being circular in a cross section taken along a plane perpendicular to a direction of an air flow in said second subpassage.

4. The air flow meter according to claim 3, wherein said projection is shaped as a hemisphere.

* * * * *